(12) United States Patent
Kameshiro et al.

(10) Patent No.: US 11,589,013 B2
(45) Date of Patent: Feb. 21, 2023

(54) AUTOMATIC DISPLAY SYSTEM FOR GAZE AREA AND REMOTE STATE MONITORING SYSTEM USING THE SAME

(71) Applicant: Hitachi, Ltd., Tokyo (JP)

(72) Inventors: Norifumi Kameshiro, Tokyo (JP); Keisuke Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/709,511

(22) Filed: Mar. 31, 2022

(65) Prior Publication Data
US 2022/0385861 A1    Dec. 1, 2022

(30) Foreign Application Priority Data
May 26, 2021  (JP) .............................. JP2021-088798

(51) Int. Cl.
*H04N 7/18*     (2006.01)
*G06V 20/52*    (2022.01)
*G08B 21/18*    (2006.01)
*H04N 5/262*    (2006.01)
*H04N 5/265*    (2006.01)

(52) U.S. Cl.
CPC ............. *H04N 7/183* (2013.01); *G06V 20/52* (2022.01); *G08B 21/18* (2013.01); *H04N 5/265* (2013.01); *H04N 5/2628* (2013.01)

(58) Field of Classification Search
CPC ........ H04N 7/18; H04N 7/183; H04N 5/2628; H04N 5/265; G06V 20/52; G08B 21/18

USPC ................................ 348/143, 152, 155, 156
See application file for complete search history.

(56) References Cited

U.S. PATENT DOCUMENTS

| 2007/0064104 A1* | 3/2007 | Ikeda ..................... H04N 7/185 348/143 |
| 2013/0208113 A1* | 8/2013 | Yoneji .................... G06V 20/52 348/143 |
| 2020/0326897 A1  | 10/2020 | Takanashi et al. |

FOREIGN PATENT DOCUMENTS

WO    2019/087577 A1    5/2019

\* cited by examiner

*Primary Examiner* — Sherrie Hsia
(74) *Attorney, Agent, or Firm* — Mattingly & Malur, PC (57) ABSTRACT

An automatic display system for a gaze area has a video input unit, an object detection unit and a gaze area setting unit that sets an area containing a part or the whole of the object detected by the object detection unit, or a predetermined area in the entire video as the gaze area. A control signal corresponding to the set gaze area information is received, and a gaze area acquisition unit acquires the gaze area from the entire video according to the control signal. A video output unit outputs a video of the acquired gaze area. The video input unit, a control signal receiving unit, and the gaze area acquisition unit are disposed in the input terminal; the gaze area setting unit and the video output unit are disposed in the output terminal; and information is transmitted between the input terminal and the output terminal by wireless communication.

15 Claims, 11 Drawing Sheets

AUTOMATIC DISPLAY SYSTEM FOR GAZE AREA AND REMOTE STATE MONITORING SYSTEM USING THE SAME

CROSS-REFERENCE TO RELATED APPLICATION

The present application claims priority from Japanese application JP2021-088798, filed on May 26, 2021, the contents of which is hereby incorporated by reference into this application.

BACKGROUND OF THE INVENTION

1. Field of the Invention

The present invention relates to a technology for supporting remote state monitoring, and more particularly to a technique for wirelessly transmitting information by reducing an amount of information by automatically extracting and cutting out a gaze area set by using an object detection technology.

2. Description of Related Art

A remote state monitoring system can be applied for the purpose of compensating for labor shortages due to a decrease in the working population or the retirement of skilled workers, or for efficient monitoring with a small number of personnel. From the viewpoint of the cost of introduction, there is a desire for a monitoring video camera system to perform as wide a range of monitoring as possible with a single monitoring camera, but in that case, there may be cases where a video of desired resolution cannot be obtained and necessary information cannot be obtained even when an important event occurs on a monitoring target.

WO-A-2019/087577 is included as a background art in the technical field. WO-A-2019/087577 discloses an information processing apparatus in which a gaze area in an imaging region is set in advance, and an area to be displayed from the gaze area is determined according to a state of an object, that is, a position, a moving state, or the like.

WO-A-2019/087577 has a problem that, even when the object moves, a video of an appropriate place is automatically displayed on a display device, but it is a photographer who decides the gaze area and display position, and an observer only sees a projected image and cannot set a desired observation position.

In a remote state monitoring system, it is necessary to monitor the monitoring target having a high resolution video so that details can be checked when an important event occurs on the monitoring target, while performing monitoring as wide a range of monitoring as possible with one monitoring camera. For example, by using high-speed, large-capacity, low-latency wireless communication such as the 5th generation mobile communication system (5G), a camera video of high resolution can be used for a remote state monitoring system, but it is desirable to avoid using the camera video of high resolution all the time because a heavy load is imposed on a communication band and information processing apparatus. Further, it is desirable to avoid storing an object image of high resolution because a high load is imposed on a storage device. Furthermore, it is more convenient to set the monitoring target by the observer who is performing the monitoring, and it is desirable that the observer has a mechanism for setting and canceling the target while appropriately monitoring.

SUMMARY OF THE INVENTION

In view of the above problems, an object of the present invention is to provide an automatic display system for a gaze area, which allows an observer, who performs remote monitoring, to automatically acquire and display a set gaze area video, and a remote state monitoring system using the automatic display system for the gaze area.

The present invention is, for example, an automatic display system for a gaze area, including a video input unit, an object detection unit that detects a specific object from an entire video input from the video input unit, a gaze area setting unit that sets an area containing a part or the whole of the object detected by the object detection unit, or a predetermined area in the entire video as the gaze area, a control signal receiving unit that receives a control signal corresponding to set gaze area information, a gaze area acquisition unit that acquires the gaze area from the entire video according to the control signal, and a video output unit that outputs a video of the acquired gaze area, in which the video input unit, the control signal receiving unit, and the gaze area acquisition unit are disposed in the input terminal, the gaze area setting unit and the video output unit are disposed in the output terminal, and information is transmitted between the input terminal and the output terminal by wireless communication.

According to the present invention, a set gaze area video can be automatically acquired and displayed.

DESCRIPTION OF EMBODIMENTS

Hereinafter, examples of the present invention will be described with reference to the drawings.

Example 1

Figure 1:
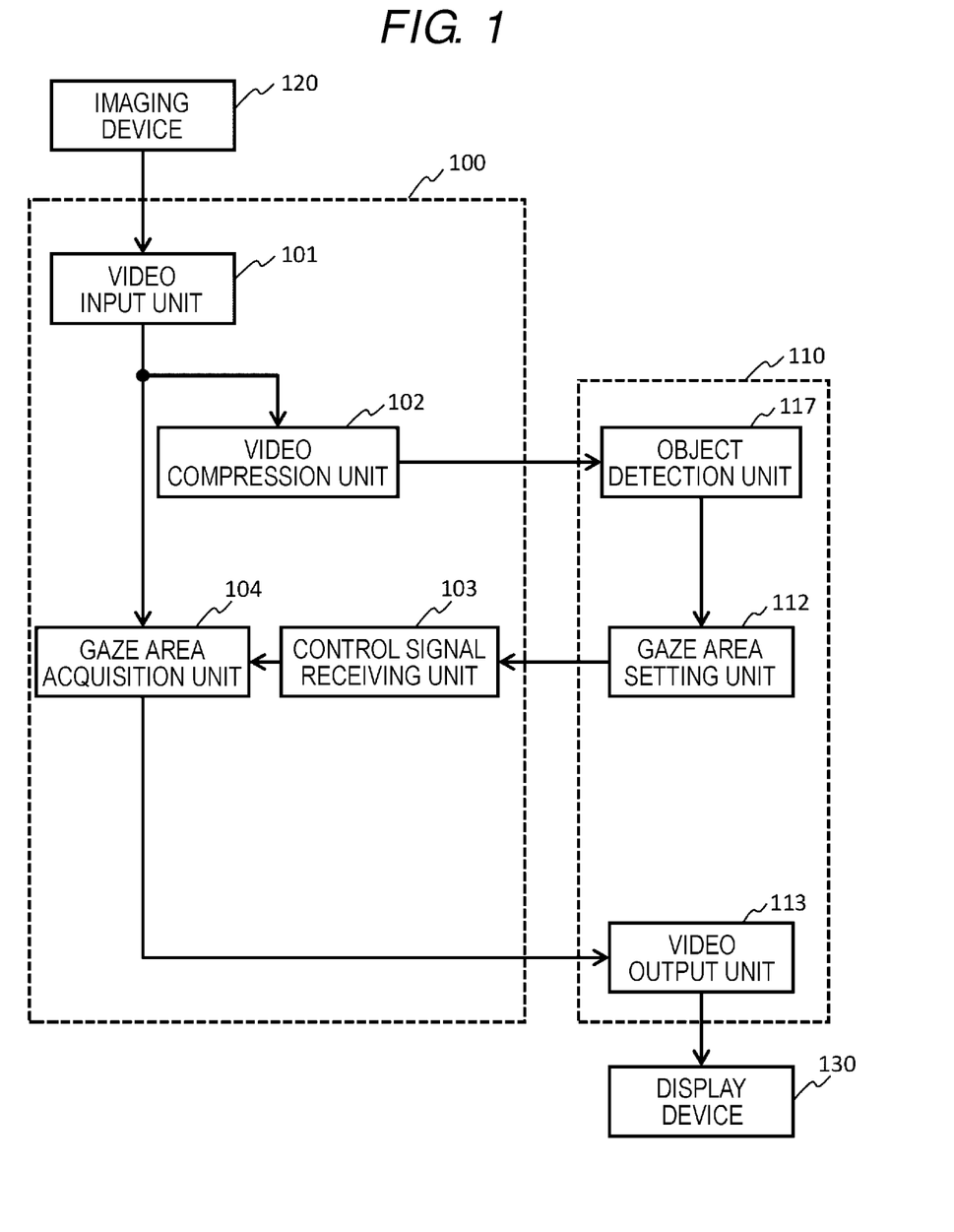
FIG. 1 is a block diagram illustrating a configuration of an automatic display system for a gaze area in Example 1.

FIG. 1 is a block diagram illustrating a configuration of an automatic display system for a gaze area in this example. In FIG. 1, an input terminal 100 is a computer terminal into which an entire video is input from an imaging device 120. Further, the output terminal 110 is a computer terminal that outputs a video transmitted from the input terminal 100 to a display device 130. The computer terminal may be any terminal capable of performing desired information processing, such as an information processing terminal that collects information from a general personal computer, server equipment, an IoT device, or the like. That is, a hardware of the computer terminal is composed of a processing processor such as a general central processing unit (CPU) and a storage device, and reads programs and information that realize each function from the storage device, and executes predetermined processing by software processing.

In FIG. 1, the entire video input from a video input unit 101 disposed in the input terminal 100 becomes a compressed video having lower resolution than the input video by the video compression unit 102 disposed in the input terminal 100, and is transmitted to an object detection unit 117 disposed in the output terminal 110. The object detection unit 117 detects a specific object (person or object) included in the entire video by using a known object detection technique such as object detection AI by template matching or deep learning.

A gaze area setting unit 112 disposed in the output terminal 110 sets a gaze area in which a part or the whole of an object detected by the object detection unit 117 is contained. A control signal receiving unit 103 disposed in the input terminal 100 receives a control signal corresponding to gaze area information set by the gaze area setting unit 112. A gaze area acquisition unit 104 disposed in the input terminal 100 acquires the gaze area from the entire video according to the control signal. A video output unit 113 disposed in the output terminal 110 receives a gaze area video and outputs the gaze area video to a display device 130. Information is transmitted between the input terminal 100 and the output terminal 110.

In FIG. 1, since high-speed, large-capacity, and low-latency wireless communication such as 5G is used for the wireless communication between the input terminal 100 and the output terminal 110, a transmission delay is small. Furthermore, since the transmitted video is a compressed video or a gaze area video cut out from the entire video, it is possible to suppress the load of the communication band and the load of information calculation in the object detection unit. Further, since the gaze area setting unit 112 is disposed in the output terminal 110, an observer who performs remote monitoring can operate the output terminal 110 and set the gaze area while viewing the video of the display device 130.

Next, gaze area setting of the gaze object will be described. FIGS. 2A to 2D are image diagrams illustrating a graphical user interface (GUI) of a setting screen for setting gaze area information input by the observer in the gaze area setting unit 112 of FIG. 1. The observer of a remote state monitoring system can use a GUI to set an object or area to be gazed. This GUI may be displayed on the display device 130, or may be displayed by installing a dedicated monitor.

Figure 2A:
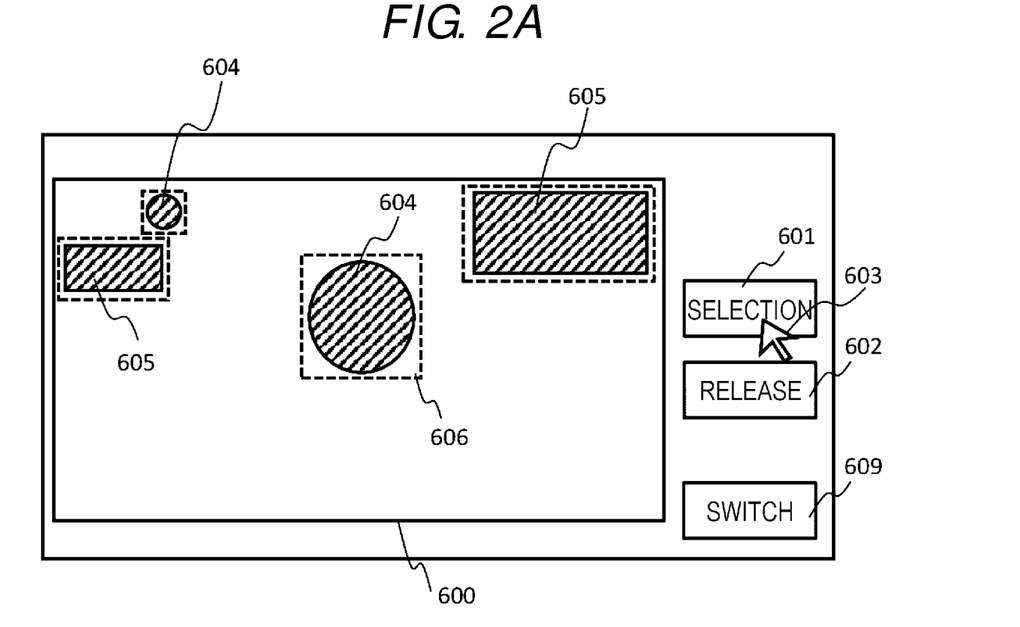
FIG. 2A is an image diagram illustrating a GUI of a setting screen for setting the gaze area of a gaze object in Example 1.

In FIG. 2A, the observer operates a pointer 603 on a screen with a mouse or the like to set conditions. On a gaze area setting screen 600 where the entire screen is displayed, the entire video of the object detected by the object detection unit 117 is displayed, and a plurality of first objects 604 (for example, people) and second objects 605 (for example, cars) are surrounded by a bounding box 606 as an object detection result. When a selection button 601 is selected, a gaze object selection mode is set, and when a release button 602 is selected, the selected gaze object and gaze area are released. When a switching button 609 is pressed, the video displayed on the display device 130 is switched from the gaze area video to the entire video.

Figure 2B:
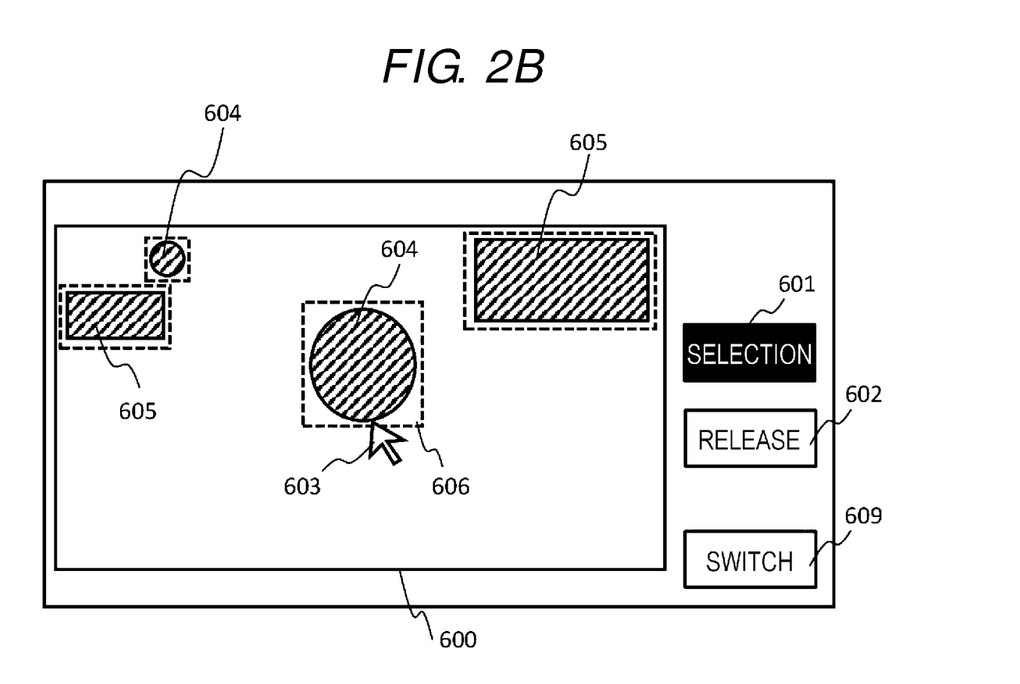
FIG. 2B is an image diagram illustrating a GUI of the setting screen for setting the gaze area of the gaze object in Example 1.
Figure 2C:
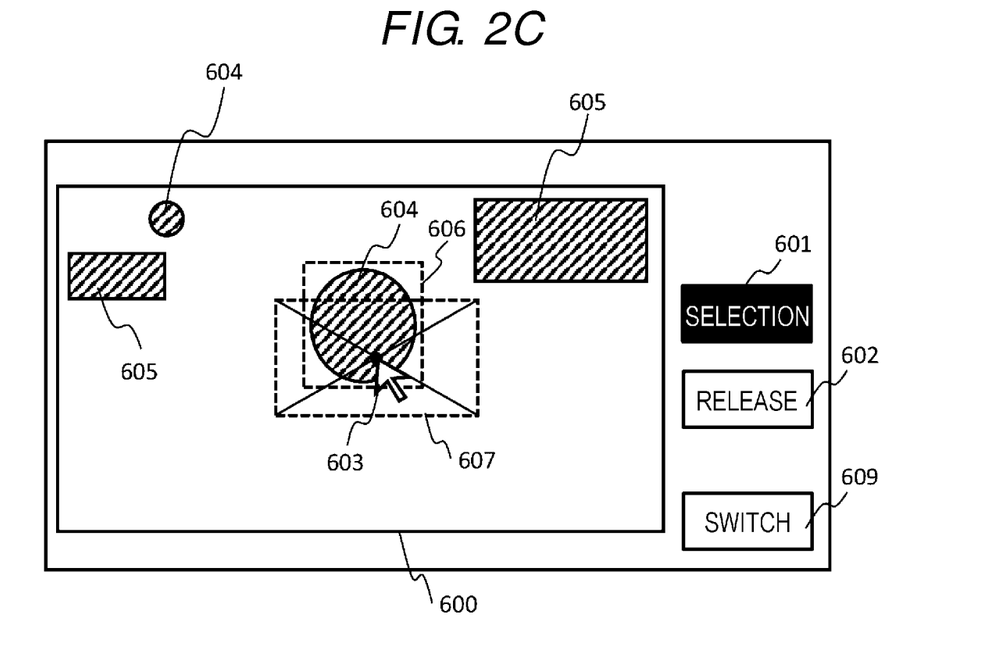
FIG. 2C is an image diagram illustrating a GUI of the setting screen for setting the gaze area of the gaze object in Example 1.

When the selection button 601 is selected, a mode for selecting the gaze object is set as illustrated in FIG. 2B. Here, the case where the pointer 603 is moved in order to select a first object 604 in the middle is illustrated. When the first object 604 is selected, a gaze selection window 607 for setting the gaze area for the selected gaze object is displayed as illustrated in FIG. 2C. Here, the gaze selection window 607 can be set in advance by the observer in an arbitrary size centering on an instruction point of the pointer 603. The gaze selection window 607 is disposed so that a place to be particularly observed of the gaze object is reflected, and the gaze area is determined by performing selection.

Figure 2D:
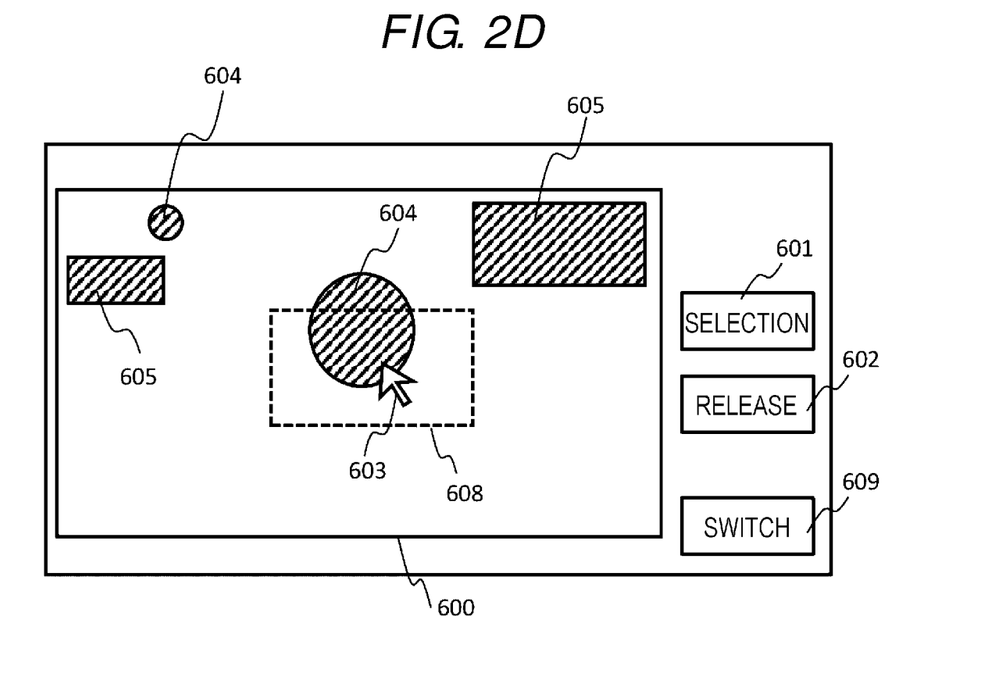
FIG. 2D is an image diagram illustrating a GUI of the setting screen for setting the gaze area of the gaze object in Example 1.

When the gaze area is determined, as illustrated in FIG. 2D, the selection mode display of the selection button 601 disappears, and a gaze window 608, which is gaze area information representing the gaze area, is displayed. As a result, the gaze area setting of the gaze object is completed.

Figure 3A:
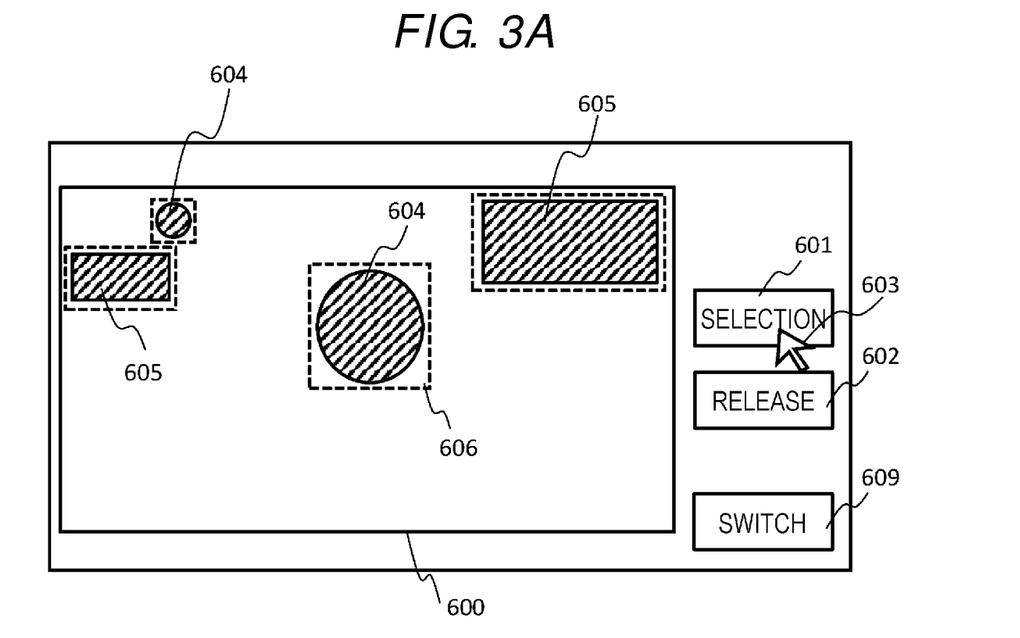
FIG. 3A is an image diagram illustrating a GUI of a setting screen for setting a gaze area on a screen in Example 1.
Figure 3B:
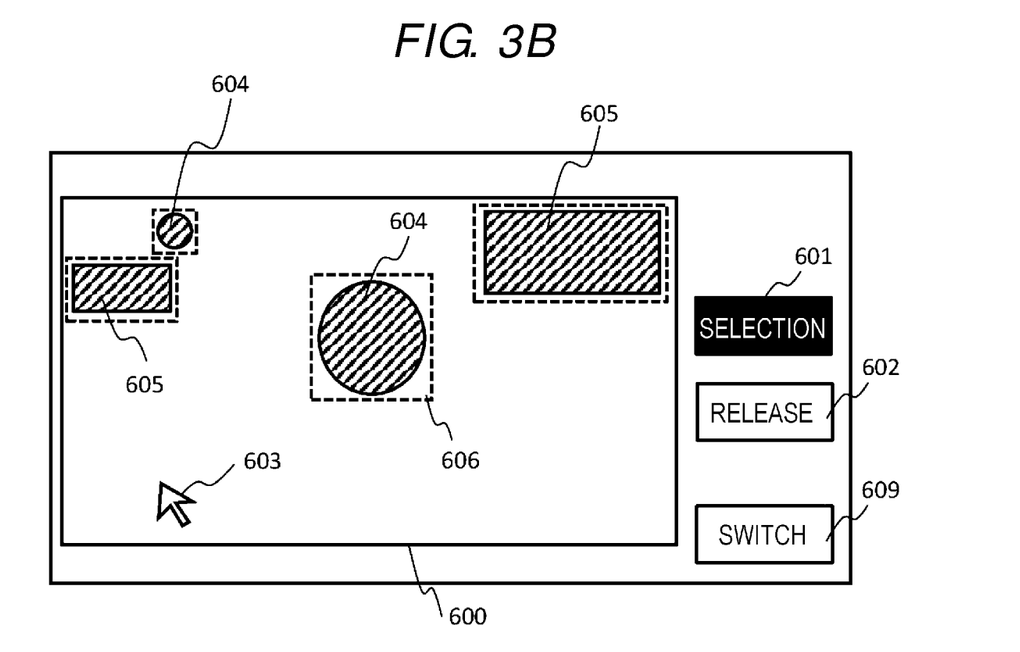
FIG. 3B is an image diagram illustrating a GUI of the setting screen for setting the gaze area on the screen in Example 1.

Next, the gaze area setting on a screen will be described. In FIGS. 2A to 2D, a specific object is selected, and a predetermined portion is set to be the center of the gaze area so as to follow the object. FIGS. 3A to 3D are explanatory diagrams of a method of setting to gaze at a specific area on the screen instead of an object. In FIG. 3A, when the selection button 601 is selected in the same manner as in FIG. 2A, the gaze object selection mode is set, and when the release button 602 is selected, the selected gaze object and gaze area are released. When the selection button 601 is selected, a mode for selecting the gaze object is set as illustrated in FIG. 3B. In FIG. 3B, in order to set the lower left area of the gaze area setting screen 600 as the gaze area, an area without an object surrounded by a bounding box is selected. Therefore, the case where the pointer 603 is moved to the lower left is illustrated.

Figure 3C:
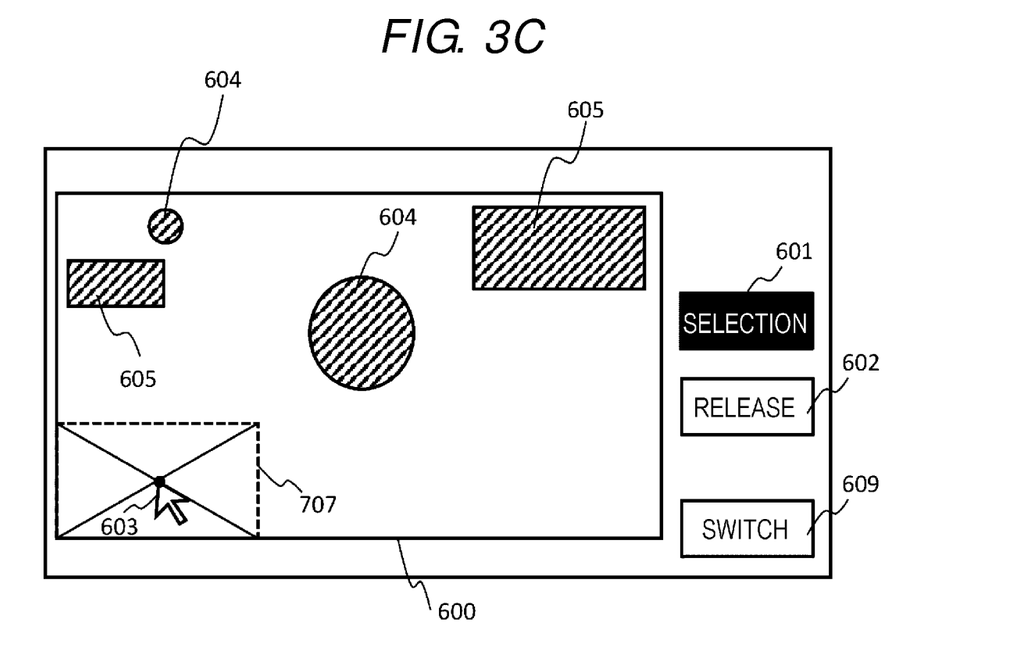
FIG. 3C is an image diagram illustrating a GUI of the setting screen for setting the gaze area on the screen in Example 1.
Figure 3D:
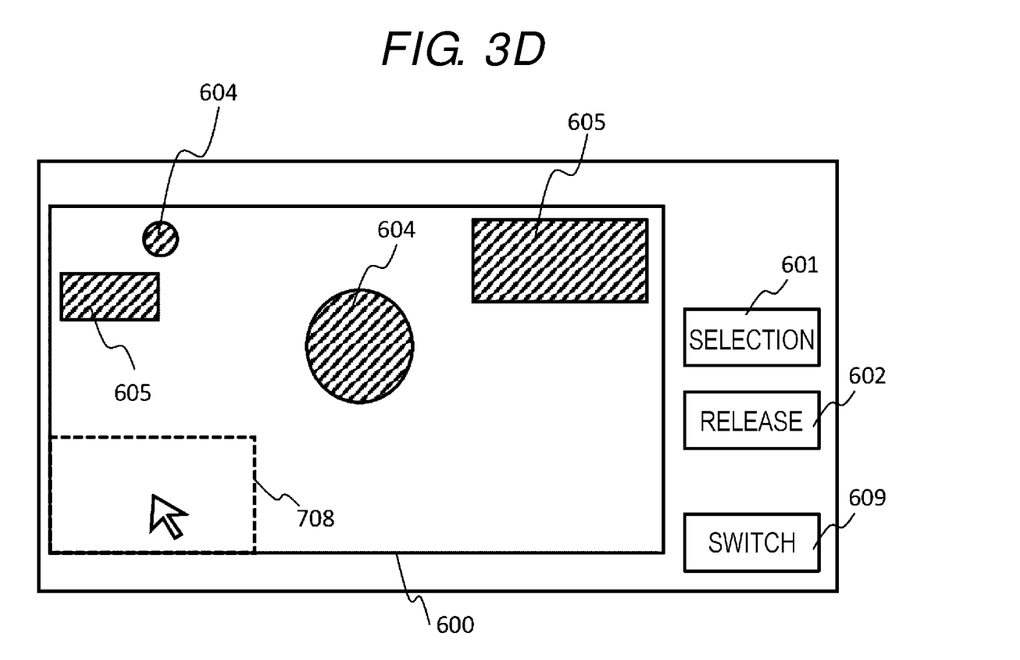
FIG. 3D is an image diagram illustrating a GUI of the setting screen for setting the gaze area on the screen in Example 1.

When the area without an object surrounded by a bounding box is selected, a gaze selection window 707 for setting a gaze area is displayed as illustrated in FIG. 3C. The gaze selection window 707 is disposed at an observation place and performs selection to determine the gaze area. When the gaze area is determined, as illustrated in FIG. 3D, the selection mode display of the selection button 601 disappears, and a gaze window 708, which is gaze area information representing the gaze area, is displayed. As a result, setting of the gaze area on the screen is completed.

As described above, according to this example, since the gaze area setting unit is disposed in the output terminal, the observer who performs remote monitoring can set the gaze area while viewing the video of the display device by operating the output terminal and automatically acquiring and displaying the set gaze area image. Further, since high-speed, large-capacity, low-latency wireless communication such as 5G is used for wireless communication between the input terminal and the output terminal, the transmission delay can be reduced. Furthermore, since the transmitted video is a compressed video or a gaze area video cut out from the entire video, it is possible to suppress the load of the communication band and the load of information calculation in the object detection unit.

Example 2

Figure 4:
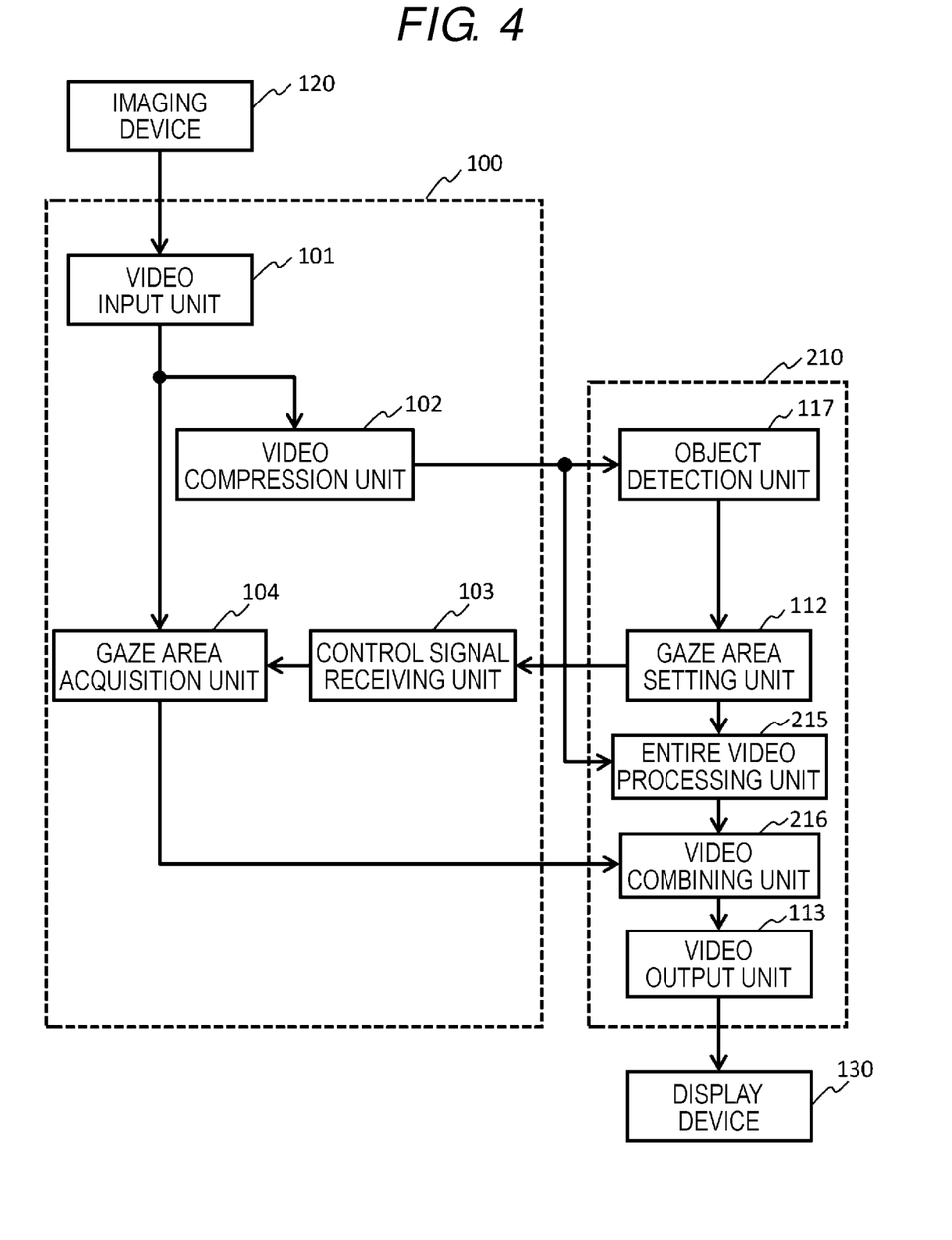
FIG. 4 is a block diagram illustrating a configuration of an automatic display system for a gaze area in Example 2.

FIG. 4 is a block diagram illustrating a configuration of an automatic display system for a gaze area in this example. In FIG. 4, the same functions as those in FIG. 1 are designated by the same reference numerals, and the description thereof will be omitted. In FIG. 4, the difference from FIG. 1 is that an entire video processing unit 215 and a video combining unit 216 are additionally disposed in the output terminal 210.

In FIG. 4, the control signal corresponding to the gaze area information set by the gaze area setting unit 112 is transmitted and input to the control signal receiving unit 103 and the entire video processing unit 215. The entire video processing unit 215 adds and processes the gaze area information to the compressed entire video transmitted from the video compression unit 102. Furthermore, the video combining unit 216 combines the processed video input from the entire video processing unit 215 and the gaze area video transmitted from the gaze area acquisition unit 104, and inputs the combined video to the video output unit 113.

As a result, since the compressed entire video having low resolution and the gaze area video cut out from the entire video can be displayed at the same time, remote state monitoring including the surrounding situation of the gaze area becomes possible. In this configuration, in the video combining unit 216, there is a delay in the video transmitted and input from the gaze area acquisition unit 104 as compared with the video input from the entire video processing unit 215. However, when low-latency wireless communication such as 5G is used, it is possible to use wireless communication by ignoring the delay, or control for synchronization with a time stamp added to video information may be performed.

Figure 5A:
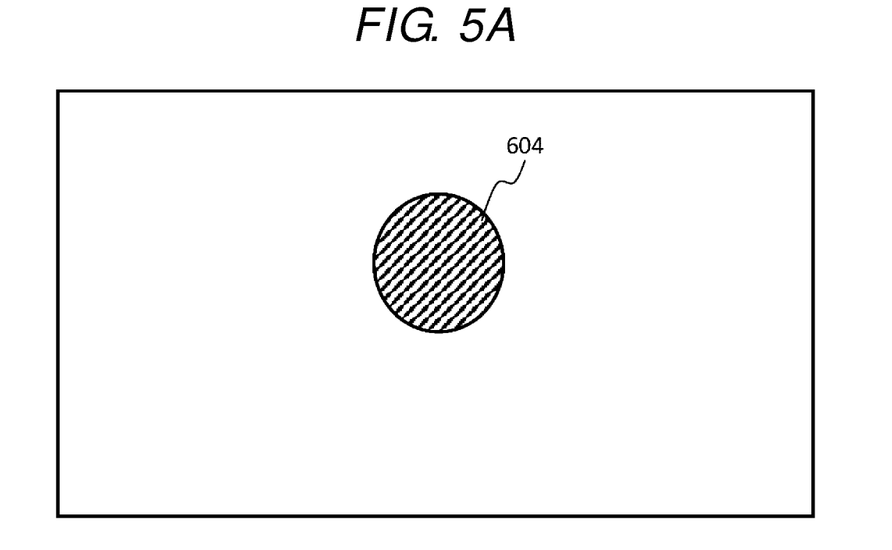
FIG. 5A is a diagram illustrating a method of combining a video in a video combining unit in Example 2.
Figure 5B:
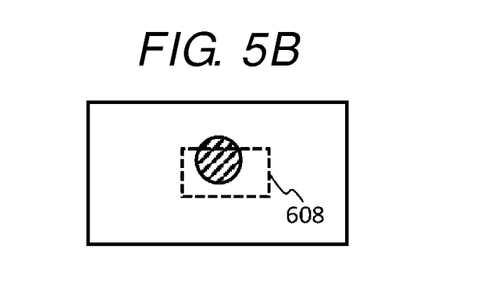
FIG. 5B is a diagram illustrating a method of combining a video in the video combining unit in Example 2.
Figure 5C:
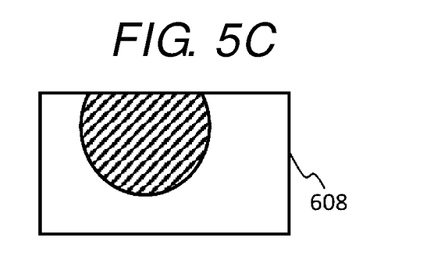
FIG. 5C is a diagram illustrating a method of combining a video in the video combining unit in Example 2.

Next, a method for combining videos by the video combining unit 216 of FIG. 4 will be described. FIG. 5A illustrates the entire video input to the video input unit 101. FIG. 5B illustrates a compressed entire video in which gaze area information is added and processed by the entire video processing unit 215. FIG. 5C illustrates a gaze area video cut out from the entire video of high resolution by the gaze area acquisition unit 104. A video is combined from the compressed entire video of FIG. 5B and the gaze area video of FIG. 5C.

Figure 6:
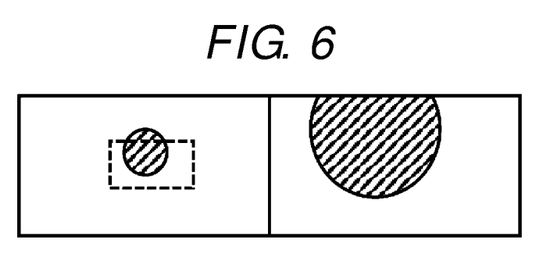
FIG. 6 is an image diagram illustrating an example of a combined video in Example 2.

FIG. 6 illustrates a video combined by disposing the compressed entire video of FIG. 5B and the gaze area video of FIG. 5C to be aligned. When combining the videos in this way, no special control is required, and videos disposed to be aligned can be combined by using moving picture editing software. Further, when there is no need to combine the videos, each video can be displayed by moving picture reproduction software started individually.

Figure 7:
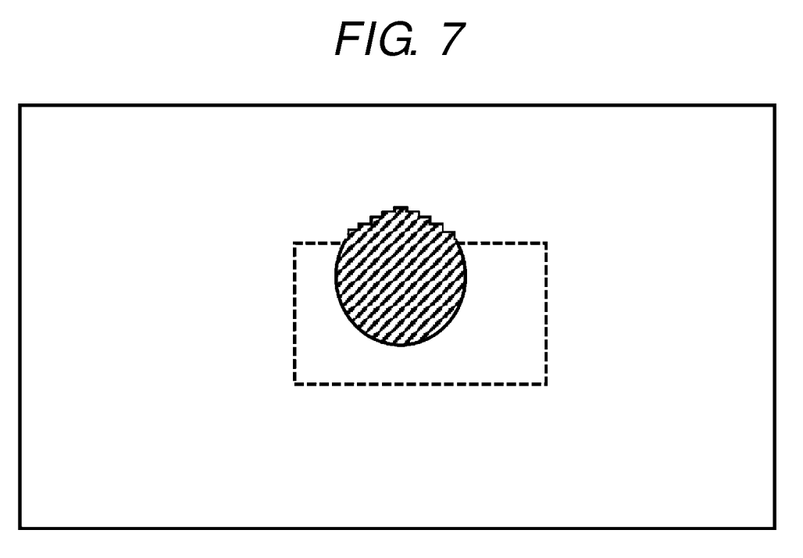
FIG. 7 is an image diagram illustrating another example of the combined video in Example 2.

In FIG. 7, the compressed entire video of FIG. 5B is enlarged and displayed to the size of the original video, and furthermore, FIG. 7 illustrates a video combined by embedding the gaze area video in an area at a predetermined position. When combining the videos in this way, position control for embedding and combining the gaze area is needed and synchronization control is indispensable because a delay of video is noticeable. On the other hand, since the gaze area can be viewed at high resolution while checking the compressed entire video of lower resolution, the remote state monitoring system provides video display that is easy to monitor.

As described above, according to this example, since the compressed entire video having low resolution and the gaze area video cut out from the entire video can be displayed at the same time, remote condition monitoring including the surrounding conditions of the gaze area becomes possible.

Example 3

Figure 8:
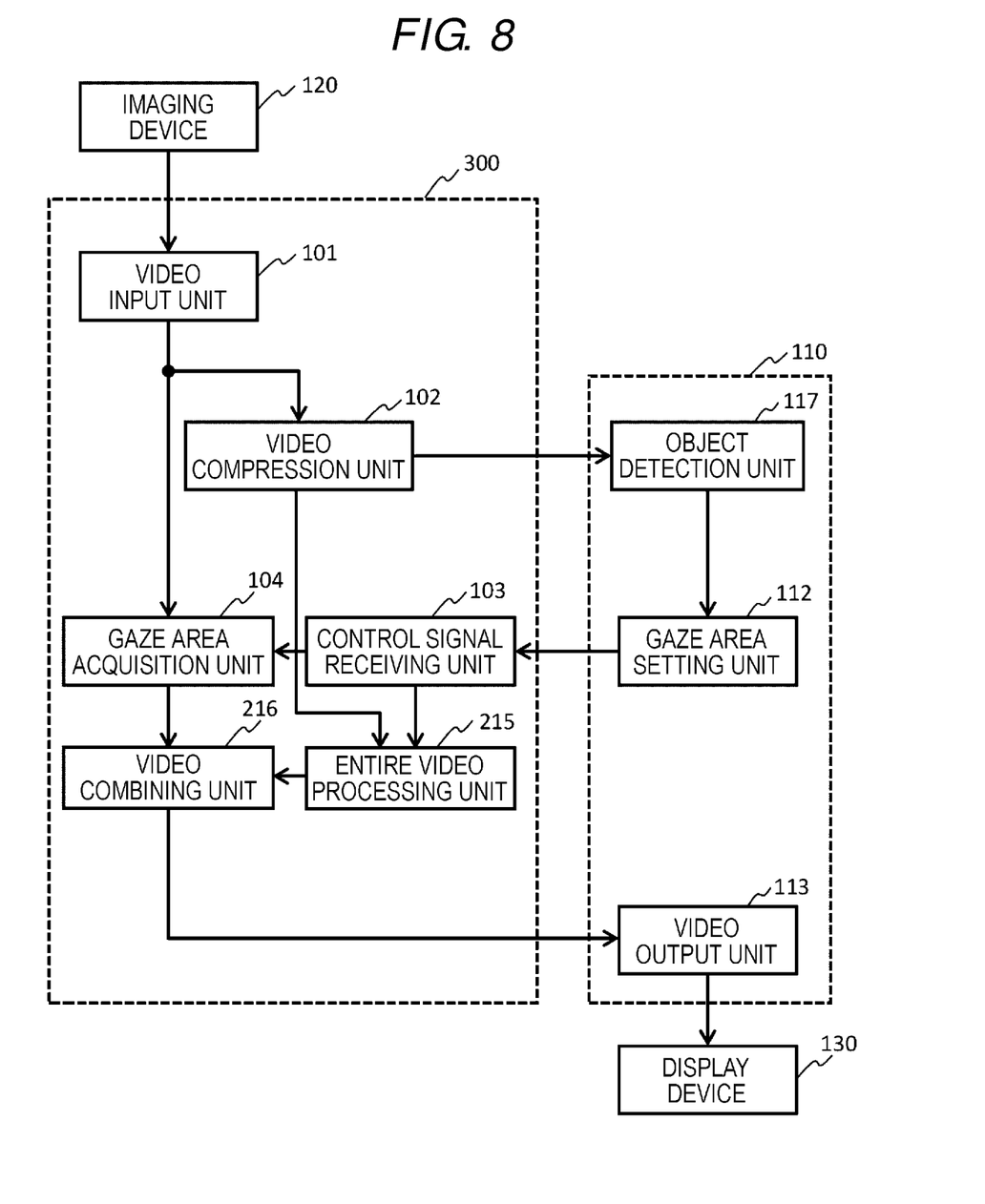
FIG. 8 is a block diagram illustrating a configuration of an automatic display system for a gaze area in Example 3.

FIG. 8 is a block diagram illustrating a configuration of an automatic display system for a gaze area in this example. In FIG. 8, the same functions as those in FIG. 4 are designated by the same reference numerals, and the description thereof will be omitted. In FIG. 8, the difference from FIG. 4 is that the entire video processing unit 215 and the video combining unit 216 are disposed in the input terminal 300.

In FIG. 8, the control signal corresponding to the gaze area information set by the gaze area setting unit 112 is transmitted to the control signal receiving unit 103, and then each control signal from the control signal receiving unit 103 is input to the gaze area acquisition unit 104 and the entire video processing unit 215. The gaze area acquisition unit 104 cuts out and acquires the gaze area according to the control signal from the entire video input from the video input unit 101. The entire video processing unit 215 adds the gaze area information to the compressed entire video input from the video compression unit 102 to be processed, and the video from the gaze area acquisition unit 104 and the video from the entire video processing unit 215 are input to the video combining unit 216. After that, the video combining unit 216 combines the videos, and the combined video is transmitted to the video output unit 113.

In this configuration, since the gaze area video is cut out and addition and processing is performed on the entire video by the control signal simultaneously output from the control signal receiving unit 103, the delay between the videos to be combined is very small compared to the configuration of FIG. 4. Therefore, the delay between the videos can be ignored and used. Of course, control to perform synchronization with the time stamp added to the video information may be performed.

In the remote state monitoring system, when the observer detects an abnormality during monitoring by the display device 130, an entire video of high resolution can be acquired by pressing the switching button 609 illustrated in FIG. 2A in the gaze area setting unit 112. In this case, from the control signal receiving unit 103, a signal for selecting an entire screen of the entire video is input to the gaze area acquisition unit 104 and a signal for controlling not to output a video to the video combining unit 216 is input to the entire video processing unit 215. As a result, the entire video of high resolution is output from the video combining unit 216. By pressing the switching button 609 again from this state, it is possible to return to the combined video of the original gaze area video and the video added and processed to the compressed entire video. Instead of switching the output of the entire video by manually pressing the switching button 609 in this way, the output of the entire video may be automatically switched according to a preset trigger. In this way, the entire video input from the video input unit 101 is transmitted to the video output unit 113, either manually or automatically in response to the preset trigger.

As described above, according to this example, in addition to the effect of Example 2, there is an effect that the delay between the videos to be combined can be reduced.

Example 4

Figure 9:
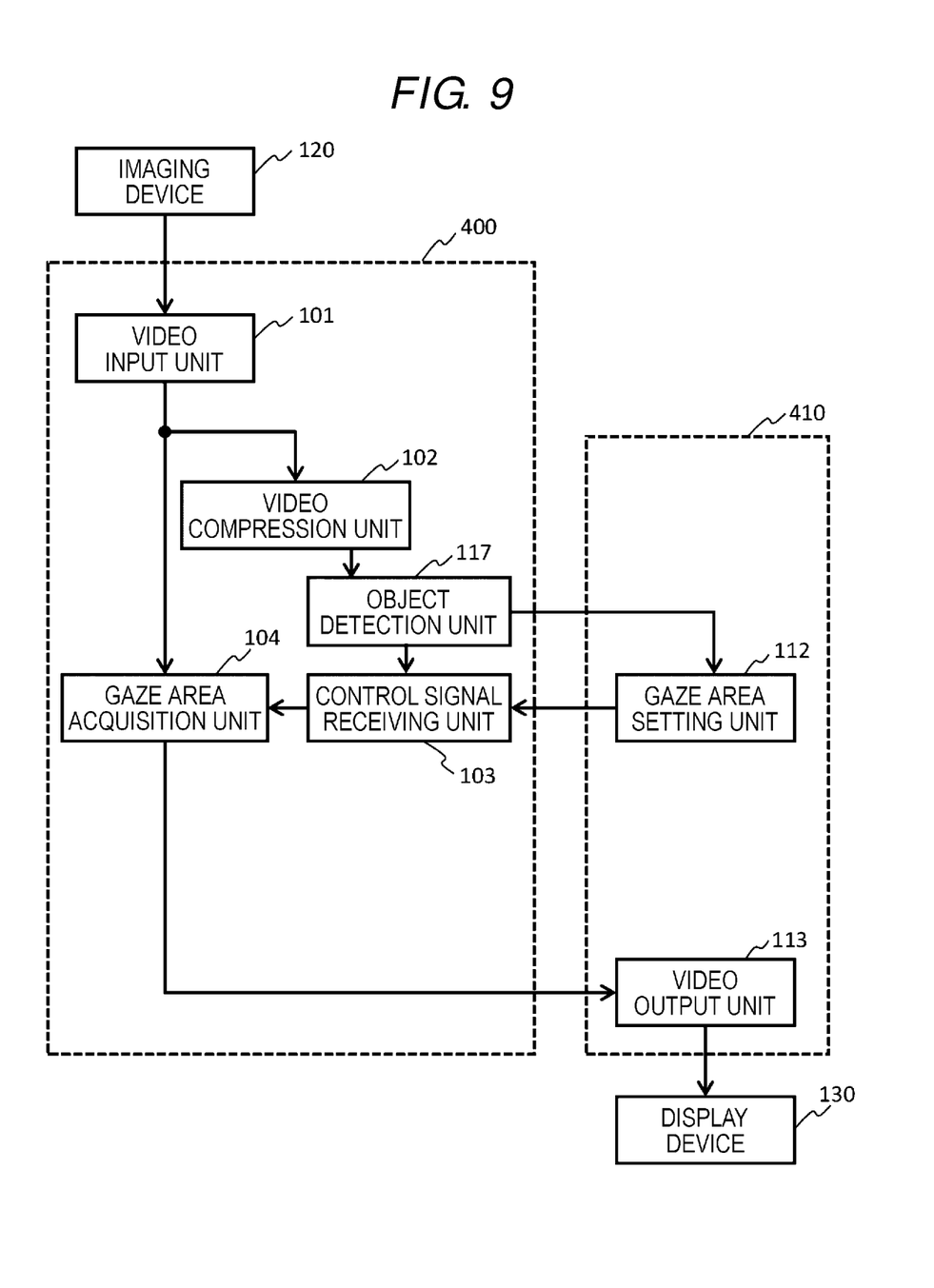
FIG. 9 is a block diagram illustrating a configuration of an automatic display system for a gaze area in Example 4.

FIG. 9 is a block diagram illustrating a configuration of an automatic display system for a gaze area in this example. In FIG. 9, the same functions as those in FIG. 1 are designated by the same reference numerals, and the description thereof will be omitted. In FIG. 9, the difference from FIG. 1 is that the object detection unit 117 is disposed in an input terminal 400. With this configuration, the number of times the video is transmitted from the input terminal 400 to an output terminal 410 can be reduced once as compared with the case of FIG. 1, and the transmission delay of the entire system can be reduced.

The configuration for detecting the object in the input terminal is not limited to FIG. 9 applied to FIG. 1. Also, in the configurations of FIGS. 4 and 8, the object detection unit 117 may be disposed in the input terminal, and the same transmission delay reduction effect can be obtained.

Example 5

Figure 10:
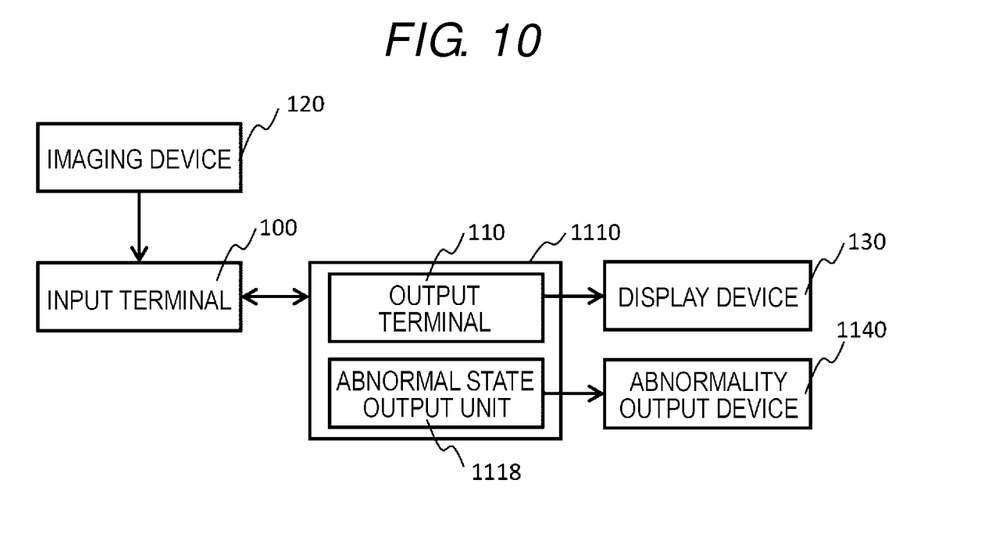
FIG. 10 is a block diagram illustrating a configuration of an automatic display system for a gaze area in Example 5.

FIG. 10 is a block diagram illustrating the configuration of the remote monitoring system in this example. In FIG. 10, the same functions as those in FIG. 1 are designated by the same reference numerals, and the description thereof will be omitted. In FIG. 10, the difference from FIG. 1 is that an abnormal state output unit 1118 is added to the output terminal 110 to configure a new output terminal 1110, and is further provided with an abnormality output device 1140.

In FIG. 10, the object detection unit 117 outputs an abnormal signal when an abnormal state (overturning of a person or object, excessive approach, contact, injury, fire, flooding, and the like) is detected. Then, the abnormal state output unit 1118 outputs an abnormal state signal corresponding to the abnormal signal, and the abnormality output device 1140 connected to the abnormal state output unit 1118 operates. It is possible for the abnormality output device 1140 to use general abnormality display methods and recording methods such as an abnormality indicator lamp, display on the display device, a warning sound, an emergency stop signal, a recording, and a sound recording. An abnormal state detection target may be the entire screen of the entire video, or the gaze area. Further, the abnormality output device 1140 may also be used as the display device 130.

Figure 11:
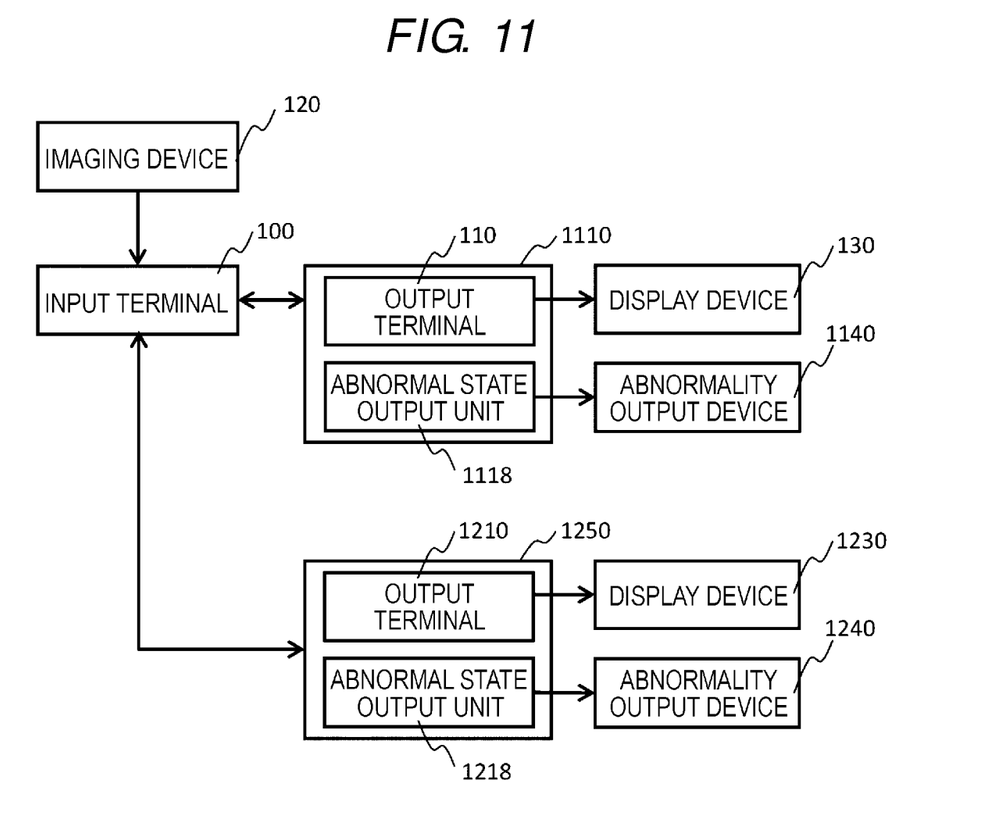
FIG. 11 is a block diagram illustrating a configuration of a remote state monitoring system for monitoring at multiple sites in Example 5.

FIG. 11 illustrates a configuration in which a second output terminal 1250 is additionally provided in the configuration of the remote monitoring system of FIG. 10. In this configuration, the gaze area video set by the output terminal 1110 can be received by the second output terminal 1250, which is disposed in a different place from the output terminal 1110 and in which an abnormal state output unit 1218 is added to the output terminal 1210, and can be observed on the display device 1230. Further, by disposing the same abnormality output device 1240 as the abnormality output device 1140, the abnormal state is output. In such multi-site monitoring, for example, when safely monitoring the surroundings of an automobile or train, information can be shared between the observer and a driver, and it is possible to quickly respond in an emergency when an abnormality occurs.

The configuration including the abnormal state output unit and the abnormality output device is not limited to FIGS. and 11 applied to FIG. 1, and may be applied to the configurations of FIGS. 4 and 8, and the same transmission delay reduction effect can be obtained.

Although the examples have been described above, the present invention is not limited to the examples described above, and includes various modification examples. For example, video data may be recorded and used. For example, the examples described above have been described in detail in order to explain the present invention in an easy-to-understand manner, and are not necessarily limited to those having all the configurations described above. Further, it is possible to replace a part of the configuration of one example with the configuration of another example, and it is also possible to add the configuration of another example to the configuration of one example. Further, for a part of the configuration of each example, another configuration can be added thereto, deleted therefrom, and replaced therewith.

What is claimed is:

1. An automatic display system for a gaze area comprising:
   a video input unit that inputs a video;
   an object detection unit that detects a specific object from an entire video input from the video input unit;
   a gaze area setting unit that sets a part or the whole of the object detected by the object detection unit, or a predetermined area in the entire video as the gaze area;
   a control signal receiving unit that receives a control signal corresponding to set gaze area information by the gaze area setting unit;
   a gaze area acquisition unit that acquires the gaze area from the entire video according to the control signal; and
   a video output unit that outputs a video of the gaze area acquired by the gaze area acquisition unit,
   wherein the video input unit, the control signal receiving unit, and the gaze area acquisition unit are disposed in an input terminal,
   the gaze area setting unit and the video output unit are disposed in the output terminal, and
   information is transmitted between the input terminal and an output terminal by wireless communication.

2. The automatic display system for a gaze area according to claim 1, wherein
   the input terminal is provided with a video compression unit that compresses the input entire video, and
   the compressed entire video is input to the object detection unit to detect the object.

3. The automatic display system for a gaze area according to claim 2, wherein
   the object detection unit is disposed in the output terminal.

4. The automatic display system for a gaze area according to claim 2, further comprising:

an entire video processing unit that displays the gaze area information set by the gaze area setting unit on the entire video compressed by the video compression unit; and a video combining unit that combines videos input from the entire video processing unit and the gaze area acquisition unit, wherein the combined video is output from the video output unit.

5. The automatic display system for a gaze area according to claim 4, wherein the output terminal is provided with the entire video processing unit and the video combining unit.

6. The automatic display system for a gaze area according to claim 4, wherein the input terminal is provided with the entire video processing unit and the video combining unit, and the entire video processing unit displays the set gaze area information on the compressed entire video based on the control signal corresponding to the gaze area information from the control signal receiving unit.

7. The automatic display system for a gaze area according to claim 4, wherein the object detection unit is disposed in the input terminal.

8. The automatic display system for a gaze area according to claim 4, wherein the video combining unit combines a video obtained by disposing the videos input from the entire video processing unit and the gaze area acquisition unit to be aligned.

9. The automatic display system for a gaze area according to claim 4, wherein the video combining unit enlarges and displays the video input from the entire video processing unit to a size of an original video, and combines a video obtained by disposing the video input from the gaze area acquisition unit to be embedded in a predetermined position in the enlarged and displayed entire video.

10. The automatic display system for a gaze area according to claim 1, wherein the entire video input from the video input unit is transmitted to the video output unit manually or in response to a preset trigger.

11. A remote state monitoring system comprising:

the automatic display system for a gaze area according to claim 1, wherein, when an abnormal state is detected, the object detection unit outputs an abnormal signal.

12. The remote state monitoring system according to claim 11, wherein the output terminal is provided with an abnormal state output unit that outputs, when the abnormality signal is received, an abnormal state signal for executing abnormality processing including at least one of abnormality display, warning sound, emergency stop signal, and recording.

13. The remote state monitoring system according to claim 12, further comprising:

at least one second output terminal including a second abnormal state output unit different from the abnormal state output unit, wherein the output terminal and the second output terminal are disposed at different sites and perform monitoring at a plurality of sites.

14. An automatic display method for a gaze area comprising:

a first step of inputting a video;

a second step of detecting a specific object from the input entire video;

a third step of setting an area containing a part or the whole of the detected object, or a predetermined area in the entire video as the gaze area;

a fourth step of receiving a control signal corresponding to set gaze area information;

a fifth step of acquiring the gaze area from the entire video according to the control signal; and a sixth step of outputting a video of the acquired gaze area, wherein the first step, the fourth step, and the fifth step are performed at the input terminal, the third step and the sixth step are performed at the output terminal, and information is transmitted between the input terminal and the output terminal by wireless communication.

15. The automatic display method for a gaze area according to claim 14, wherein a seventh step of compressing the input entire video is further performed at the input terminal, and the object is detected in the second step using the compressed entire video.

* * * * *